United States Patent [19]

Bobey

[11] Patent Number: 4,637,015
[45] Date of Patent: Jan. 13, 1987

[54] PACKET TRANSMISSION AND RECEPTION VIA A SHARED DMA CHANNEL

[75] Inventor: Kenneth A. Bobey, Edmonton, Canada

[73] Assignee: Northern Telecom Limited, Montreal, Canada

[21] Appl. No.: 760,007

[22] Filed: Jul. 29, 1985

[51] Int. Cl.⁴ ............................ H04J 3/24; H04J 3/02
[52] U.S. Cl. .......................................... 370/94; 370/85
[58] Field of Search .............................. 370/60, 85, 94

[56] References Cited

U.S. PATENT DOCUMENTS 4,168,469  9/1979  Parikh et al. ........................ 370/85
4,418,384  11/1983  Holtey et al. ........................ 364/200
4,523,310  6/1985  Brown et al. ........................ 370/112

Primary Examiner—Douglas W. Olms
Assistant Examiner—Wellington Chin
Attorney, Agent, or Firm—R. John Haley

[57] ABSTRACT

A DMA channel is shared by transmit and receive ports via which data packets are transmitted and received using a bit oriented protocol such as HDLC. For the transmission of each packet, an abort signal of the protocol is initially transmitted, and the packet is transmitted when the DMA channel is free after a delay equal to the packet transmission turnaround time. In response to receipt of the abort signal, the DMA channel is reserved for reception of a packet within a time-out period. The DMA channel adopts a receive state in response to the abort signal either immediately if it is free, or at the end of transmission if a packet is currently being transmitted.

7 Claims, 4 Drawing Figures

PACKET TRANSMISSION AND RECEPTION VIA A SHARED DMA CHANNEL

This invention relates to the transmission of data packets via a communications link or network, and is particularly concerned with a method of transmitting and receiving packets of data via respective transmit and receive serial communications ports which share a direct memory access (DMA) channel for the packets. The term "packet" is used herein to mean a frame of information which is bounded by flags and which is transmitted using a BOP (bit oriented protocol) such as SDLC, HDLC, or ADCCP. A discussion of BOPs is contained for example in the introductory parts of Kyu et al. U.S. Pat. No. 4,358,825 issued Nov. 9, 1982.

It is well known to use a BOP such as HDLC for communicating data between different processing nodes. In order to reduce demands on a microprocessor in each processing node, it is also well known to use a dedicated data link controller or serial communications controller in such a communications arrangement for handling functions associated with the communications, such as formatting and detecting frames, inserting and removing zero bits, and generating and checking cyclical redundancy codes. Furthermore, it is known to use direct memory access (DMA) in order to transfer data expediently between the serial communications controller and a memory accessed by the microprocessor. In order to facilitate this, it is also known to incorporate DMA channel handling capabilities in the microprocessor integrated circuit chip itself, one example of such a chip being the Intel 80186 microprocessor. This microprocessor provides for two DMA channels, which are typically used respectively for transmitting and receiving data packets.

While the provision of DMA channels in the microprocessor chip itself is a convenience, this convenience is lost if there are more communications ports, via each of which data packets may be transmitted or received, then there are DMA channels in the chip. For example, an 80186 microprocessor has only two DMA channels, and this is insufficient to handle data packets on four serial communications ports providing bidirectional (transmit and receive) traffic on two separate packet data communications links. An example of such a situation arises for each processing node in a network as described and claimed in a copending patent application entitled "Communications Network" filed simultaneously herewith.

An object of this invention, therefore, is to provide a method of transmitting and receiving packets of data via respective transmit and receive serial communications ports in a manner which permits a DMA channel for the packets to be shared.

According to this invention there is provided a method of transmitting and receiving packets of data using a bit oriented protocol via respective transmit and receive communications ports which share a direct memory access (DMA) channel for the packets, comprising the steps of: for the transmission of each packet, transmitting an abort signal via the transmit port, and transmitting the packet via the transmit port when the DMA channel is free after at least a predetermined time following transmission of the abort signal; and reserving the DMA channel for reception of a packet via the receive port in response to reception of the abort signal via the receive port.

Thus in accordance with the invention the abort signal of the BOP is transmitted prior to transmission of each packet, and serves to reserve a shared DMA channel for reception of the packet. As such a shared DMA channel may already be involved in the transmission of a packet, at least a predetermined time, preferably substantially equal to the turnaround time for transmission of packets via the communications ports, is provided as a delay between the transmission of the abort signal and the subsequent transmission of the packet. This ensures that the shared DMA channel will always be ready to receive a packet when it arrives via the receive port, regardless of its initial state.

Preferably the step of reserving the DMA channel for reception of a packet in response to reception of the abort signal comprises the steps of: if the DMA channel is free, setting it to a state for receiving a packet via the receive port; and if the DMA channel is in a state for transmitting a packet via the transmit port, setting it to a state for receiving a packet via the receive port at the end of the transmission of the packet via the transmit port. The method preferably further includes the step of terminating the reservation of the DMA channel for reception of a packet via the receive port if no packet is received via the receive port within a predetermined period.

The invention will be further understood from the following description with reference to the accompanying drawings, in which.

Figure 1:
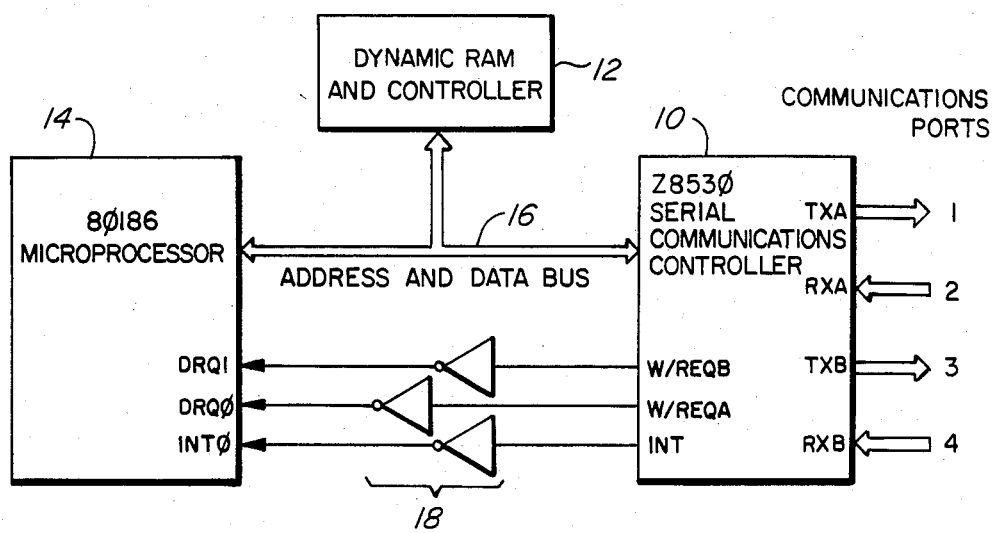
FIG. 1 is a block diagram illustrating interconnections between a serial communications controller and a microprocessor for carrying out the method of the invention.

Referring to FIG. 1, there is illustrated an arrangement in which two microprocessor DMA (direct memory access) channels are shared among four serial communications ports 1 to 4. FIG. 1 illustrates only those parts of a circuit which are directly related to the DMA channel sharing, and does not show other parts of the circuit, for example clock circuitry, which are necessary but which can be provided in well-known manner. In addition, for simplicity FIG. 1 does not illustrate details of the communications ports, each of which comprises separate data and clock lines which may be coupled for example to a respective RS-422 interface.

As illustrated in FIG. 1, the four serial communications ports 1 to 4 are coupled to an Advanced Micro Devices type Z8530 serial communications controller (SCC) 10, which provides two full-duplex (i.e. transmit TX and receive RX) channels A and B at a bit rate of up to 1 Mb/s. Thus for example the port 1 constitutes the transmit path for channel A, as indicated by the designation TXA.

Data is transferred at high speed between the SCC 10 and a memory, represented in FIG. 1 by a dynamic RAM (random access memory) and controller block 12, using DMA, the memory also being accessed by an Intel type B80186 microprocessor 14. To this end an address and data bus 16 is provided interconnecting the units 10, 12, and 14, and control and status bit registers of the SCC are mapped into the I/O (input/output) address space of the microprocessor. In addition, an interrupt output INT and respective write request channel outputs W/REQA and W/REQB of the SCC 10 are connected via respective inverters 18 to an interrupt input INT0 and DMA channel request inputs DRQ0 and DRQ1 of the microprocessor 14, the microprocessor thereby receiving and processing one interrupt for each data packet which is received or transmitted.

It can be seen from the above description and FIG. 1 that there are not enough DMA channels for the numbers of communications ports. More particularly, each DMA channel is shared between two communications ports, one for transmitting packets and one for receiving packets of data. In order to accommodate this assignment of two ports to each DMA channel, in accordance with this invention a transmission protocol is used which ensures that transmission and reception of packets do not conflict on the DMA channel. As this protocol applies equally to the two DMA channels, in the following description reference is made to only one DMA channel and the associated transmit and receive ports.

As is known generally for BOPs (bit oriented protocols), each data packet handled by the SCC 10 consists of information bounded by flag bytes, each flag byte having the bit sequence 01111110. The occurrence of this flag byte bit sequence within the transmitted information in the packet is prevented by inserting a zero bit following five consecutive one bits upon transmission, and deleting such inserted zero bits upon reception, these functions being handled in known manner by the SCC. In addition, in BOPs an abort signal is known, this signal consisting of a sequence of at least seven consecutive one bits. The abort signal obviously can not be present within a frame, either in the information (in view of the inserted zero bits) or in the flag bytes (in view of their predetermined bit sequence).

The transmission protocol used in accordance with the method of this invention makes use of the abort signal to provide an indication that a packet is to be transmitted. It follows from this that flag bytes, rather than all one bits, must be transmitted on idle communications links.

For the transmission of each packet, initially if the DMA channel is free the abort signal is transmitted. A delay is then provided which is of sufficient length to ensure that the DMA channel at the receiving end of the communications link can become free, even if it has just started the transmission of a packet. This delay is referred to as the turnaround delay, and depends among other things on the maximum length that a data packet may have. Following this delay, if the DMA channel is free the packet is transmitted.

For example, assuming that the maximum packet size is 64 bytes plus a checksum of 2 bytes, and that this is transmitted at a bit rate of 667 kb/s, then the maximum time taken to transmit a packet is about 0.8 ms. This, added to a processor latency time, allowed for example for the possible presence of other interrupts, which may be up to about 1 ms, gives a maximum total turnaround time of about 1.8 ms. In this case the turnaround delay could conveniently be selected to be about 2 ms.

For the reception of each packet, initially the SCC recognizes the abort signal at the receive port, in response to which it reserves the DMA channel to receive the packet when it arrives. A time-out period is provided to accommodate the possibility that the packet may not be transmitted. In the event that the DMA channel is already engaged in the transmission of a packet, the reservation to receive a packet takes effect at the end of this transmission; this involves a delay which is less than the turnaround delay discussed above, so that the DMA channel is able to receive the packet when it is transmitted.

Figure 2:
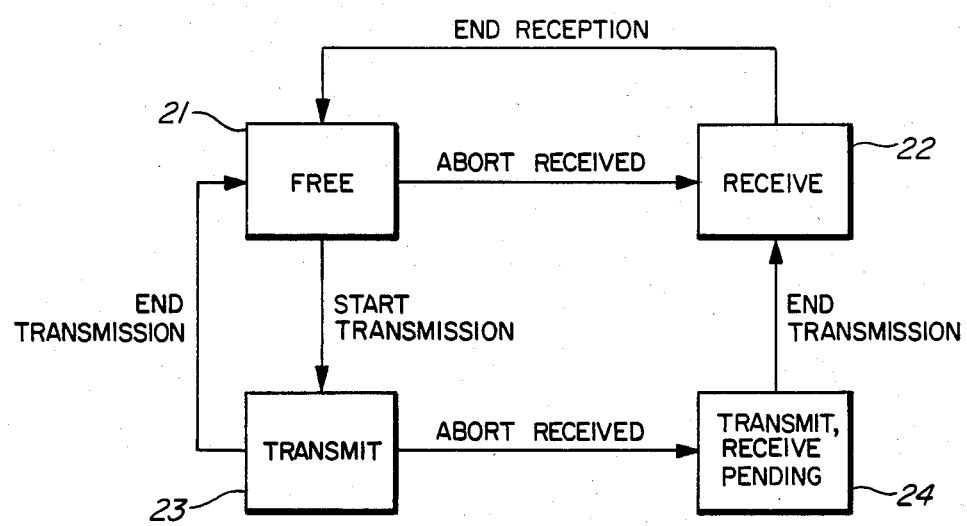
FIG. 2 is a state diagram for a direct memory access channel.

FIG. 2 illustrates states of the DMA channel, and the various transitions between these states. Four possible states are shown and referenced 21 to 24, these being referred to as the free, receive, transmit, and transmit with receive pending states respectively. When a packet is not being transmitted or received, the associated transmit and receive ports being idle, the DMA channel is in the free state 21. In the event that the abort signal is received at the receive port, the DMA channel assumes the receive state 22 so that a packet transmitted after the abort signal can be received. At the end of this reception, or at the end of the time-out period if no packet is received, the DMA channel returns to the free state.

If the DMA channel is in the free state 21 and a packet is to be transmitted, it enters the transmit state 23, and returns to the free state 21 at the end of the transmission of the packet via the associated transmit port. If the abort signal is received via the receive port while the DMA channel is in the transmit state 23, then the DMA channel adopts the transmit with receive pending state 24, in which the transmission of the relevant packet via the transmit port continues normally. At the end of the transmission of the packet, however, the DMA channel now enters the receive state 22, so that it is ready to receive the incoming packet at the receive port when it arrives after the turnaround delay, as already described above.

Figure 3:
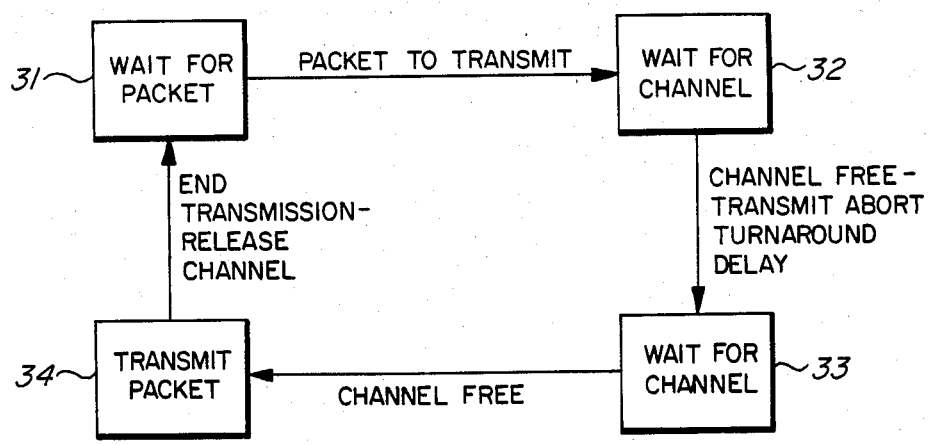
FIGS. 3 and 4 are state diagrams for respectively the transmission and reception of data packets.

FIG. 3 is a state diagram showing various states 31 to 34 involved in the transmission of a packet. Prior to a packet becoming available for transmission, a wait for packet state 31 is occupied. On arrival of a packet to be transmitted, a first wait for channel state 32 is assumed until the DMA channel is free, i.e. until the DMA channel is in state 21 of FIG. 2 so that it is available for transmission of the packet. When the DMA channel is free, the abort signal is transmitted via the transmit port and the turnaround delay is started; at the end of this delay a second wait for channel state 33 is assumed. When the DMA channel is again free, a transmit packet state 34 is assumed and the packet is transmitted via the transmit port. At the end of the transmission of the packet the DMA channel is released and the wait for packet state 31 is resumed, the packet being removed from a transmit packet buffer, if it has been successfully transmitted.

In the event of a transmission failure, or in the event that a time-out period expires in either of the wait for channel states, the channel is released and the wait for packet state 31 is resumed, the packet remaining in the transmit packet buffer so that it can be retransmitted. As in this case at least this packet is available, the wait for channel state 32 is adopted immediately, for transmitting the highest priority packet which is now available.

Figure 4:
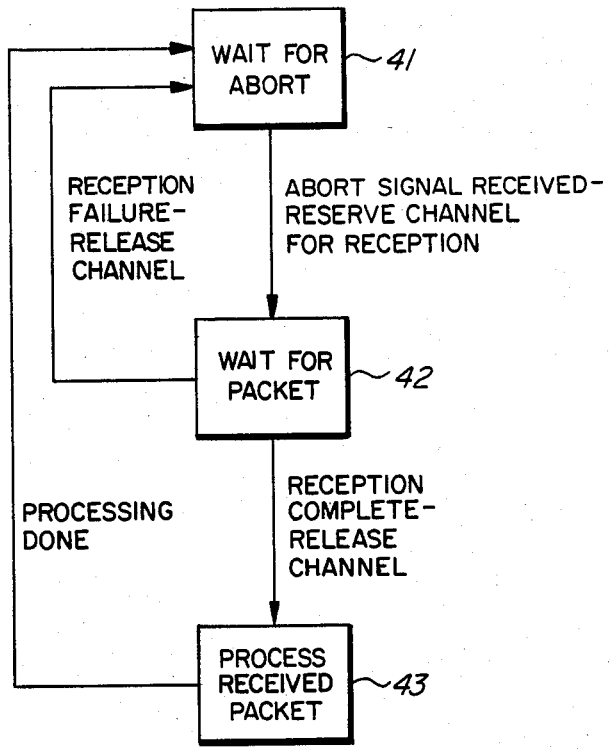

FIG. 4 is a state diagram showing states 41 to 43 involved in the reception of a packet. Initially, a wait for abort state 31 is occupied. On receipt of the abort signal which is transmitted before each packet, the DMA channel is reserved for reception of the packet, corresponding to states 22 and 24 in FIG. 2, and a wait for packet state 42 is assumed. In the event that a packet is not received within a time-out period, a reception failure is deemed to have occurred, the DMA channel is released, and a return is made to the state 41. In the event that the packet is successfully received, the DMA channel is released and the received packet is processed in a process received packet state 43, with a return to the wait for abort state 41 when this processing is finished.

From the above description it should be appreciated that the transmission of the abort signal before each packet, with the turnaround delay between the abort signal and the packet, ensures that a shared DMA channel can be reserved so that it is always free for receiving the packet.

Numerous modifications, variations, and adaptations may be made to the particular embodiment of the invention described above without departing from the scope of the invention as defined in the claims. In particular, other devices, and other arrangements of DMA channels and communications ports with different numbers of ports assigned to a smaller number of channels, than those described above can be used.

What is claimed is:

1. A method of transmitting and receiving packets of data using a bit oriented protocol via respective transmit and receive communications ports which share a direct memory access (DMA) channel for the packets, comprising the steps of:
   for the transmission of each packet, transmitting an abort signal via the transmit port, and transmitting the packet via the transmit port when the DMA channel is free after at least a predetermined time following transmission of the abort signal; and
   reserving the DMA channel for reception of a packet via the receive port in response to reception of the abort signal via the receive port.

2. A method as claimed in claim 1 wherein, for the transmission of each packet, the abort signal is transmitted via the transmit port when the DMA channel is free.

3. A method as claimed in claim 1 wherein the predetermined time is substantially equal to the turnaround time for transmission of packets via the communications ports.

4. A method as claimed in claim 1 wherein the step of reserving the DMA channel for reception of a packet in response to reception of the abort signal comprises the steps of:
   if the DMA channel is free, setting it to a state for receiving a packet via the receive port; and
   if the DMA channel is in a state for transmitting a packet via the transmit port, setting it to the state for receiving a packet via the receive port at the end of the transmission of the packet via the transmit port.

5. A method as claimed in claim 1 and including the step of terminating the reservation of the DMA channel for reception of a packet via the receive port if no packet is received via the receive port within a predetermined period.

6. A method as claimed in claim 1 wherein each packet is bounded by flag bytes, each flag byte comprising a predetermined number of consecutive bits of a first binary value bounded by bits of a second binary value, and the abort signal comprises a number of consecutive bits of the first binary value which is greater than said predetermined number.

7. A method as claimed in claim 1 wherein the bit oriented protocol is HDLC.

* * * * *